H. D. DEAM.
SHIP SALVAGING METHOD AND APPARATUS.
APPLICATION FILED JUNE 17, 1918.
1,312,473.
Patented Aug. 5, 1919.
6 SHEETS—SHEET 6.
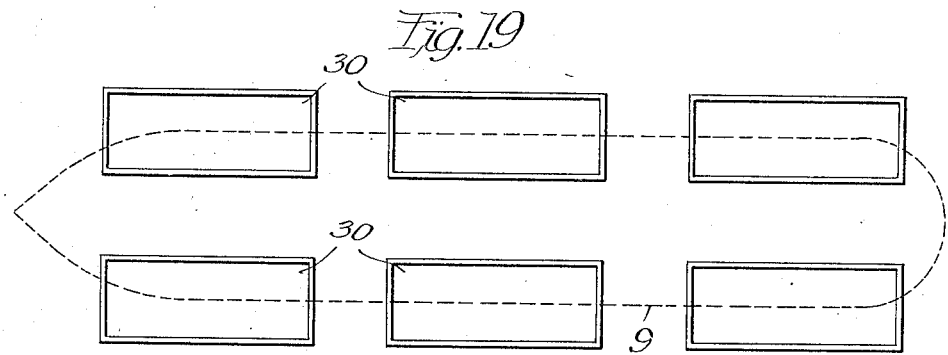
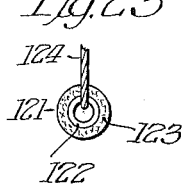
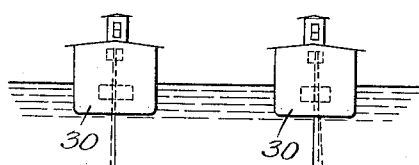
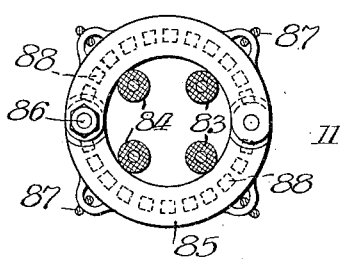
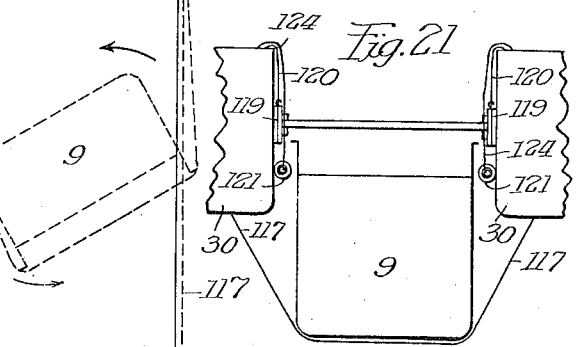
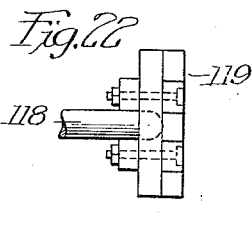
Witness:
Leonard W. Novander.
Inventor
Henry D. Deam
By E. J. Andrews
Atty

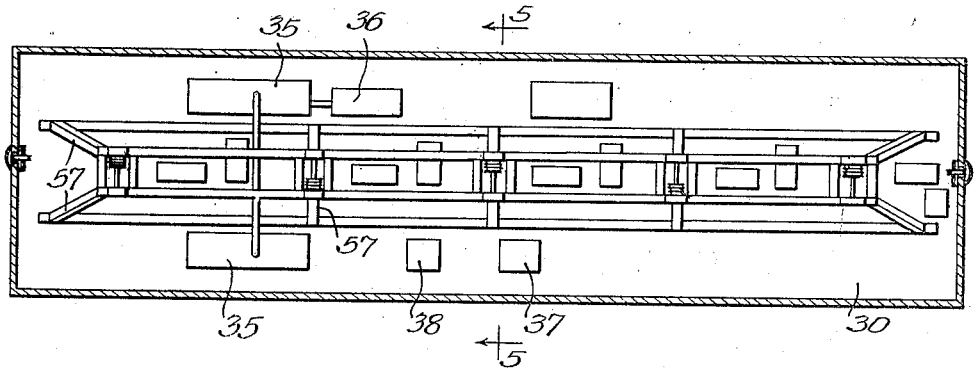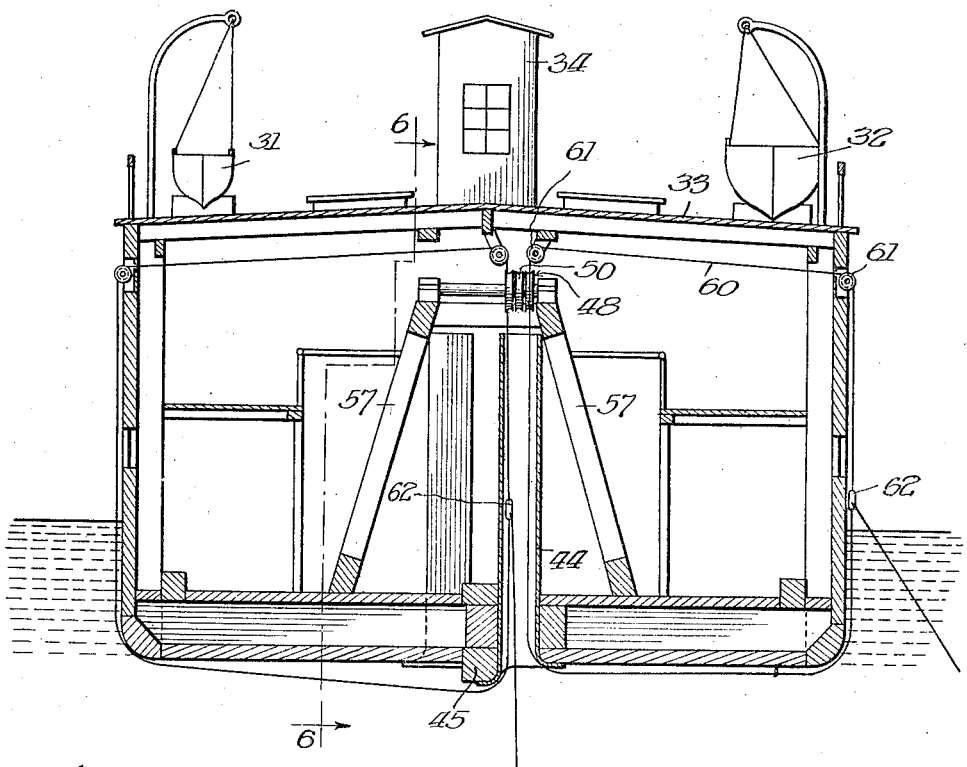

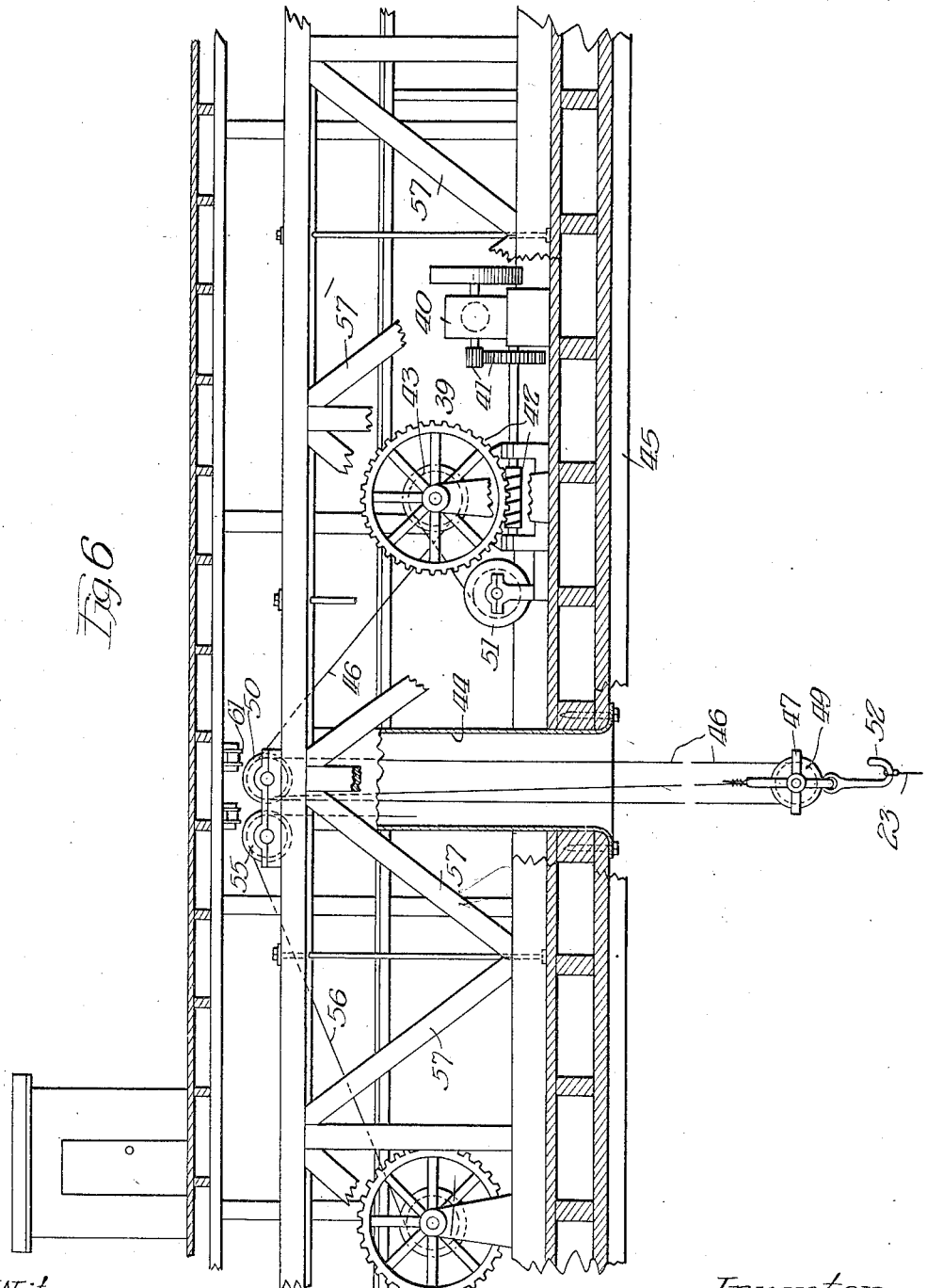

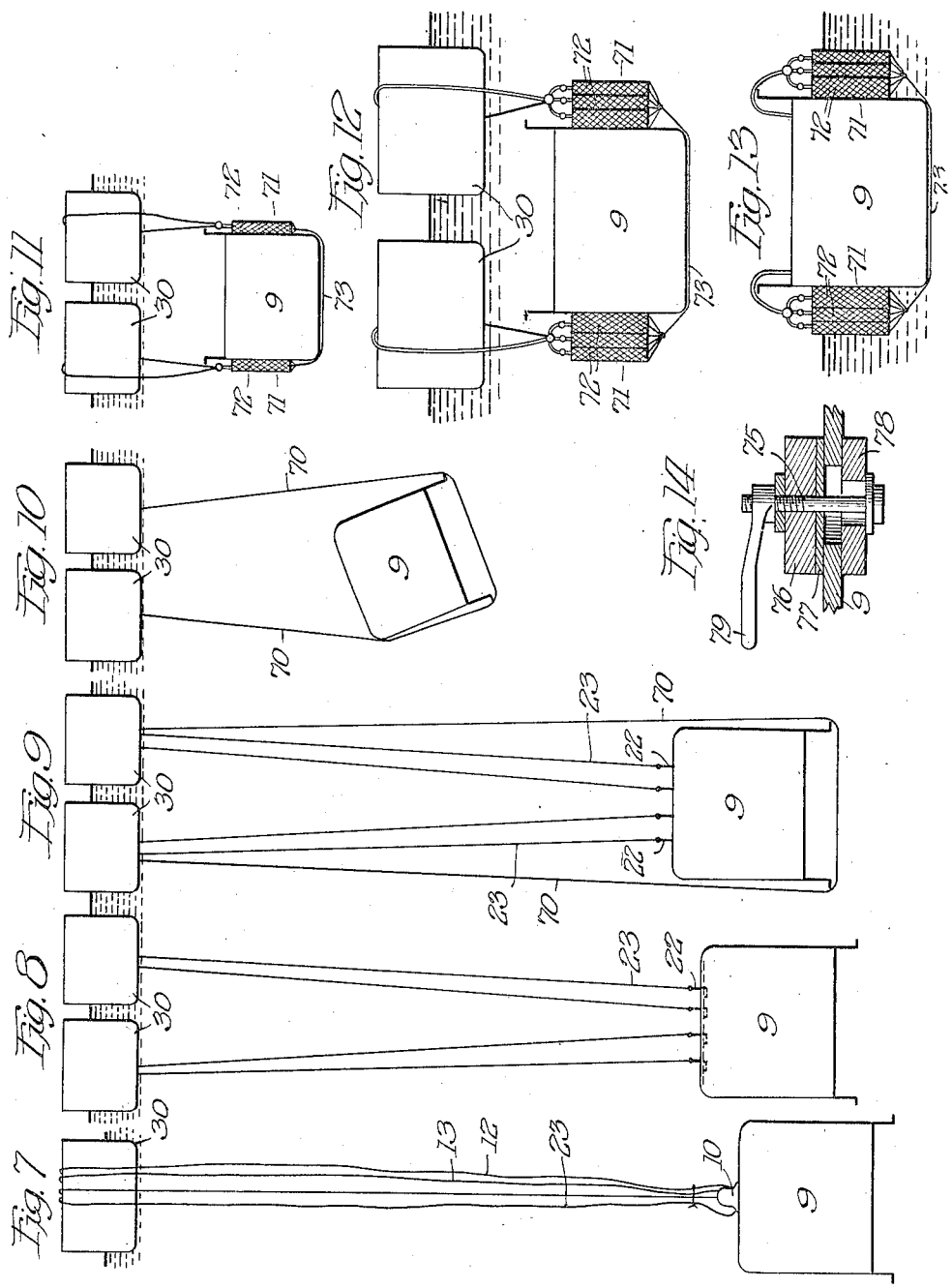

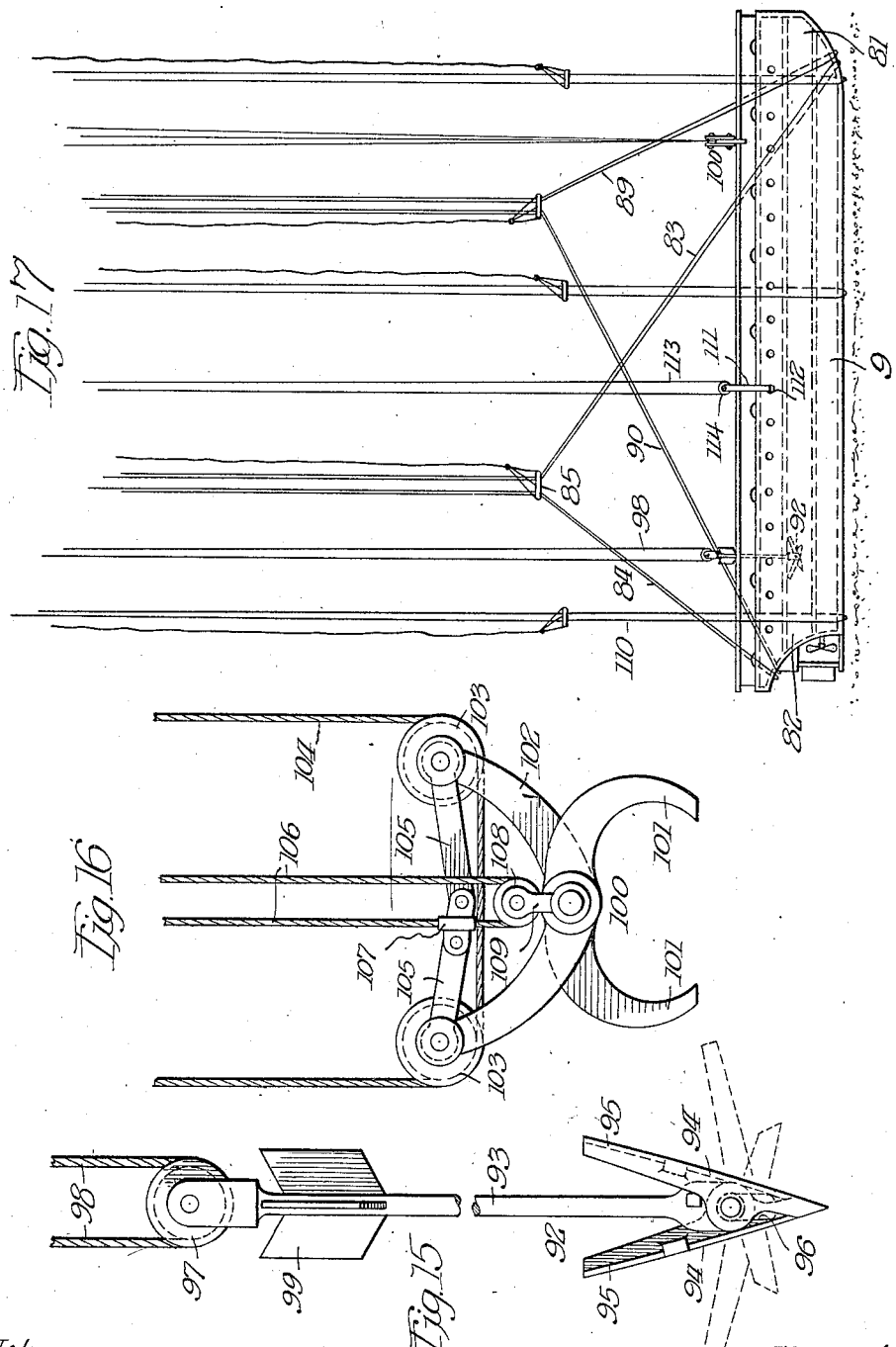

UNITED STATES PATENT OFFICE.

HENRY D. DEAM, OF BENTON HARBOR, MICHIGAN.

SHIP-SALVAGING METHOD AND APPARATUS.

1,312,473.      Specification of Letters Patent.      Patented Aug. 5, 1919.

Application filed June 17, 1918. Serial No. 240,313.

*To all whom it may concern:*

Be it known that I, HENRY D. DEAM, a citizen of the United States, residing at Benton Harbor, in the county of Berrien and State of Michigan, have invented certain new and useful Improvements in Ship-Salvaging Methods and Apparatus, of which the following is a specification.

This invention relates to the salvaging of boats, and particularly to the salvaging of boats which are sunk in deep water or which are otherwise difficult of access. The object of the invention is to produce a method for raising and floating such boats and to provide suitable apparatus for carrying out the method.

When a boat is sunk in deep water, it is difficult to reach the boat and attach to it suitable means by which it may be raised; and the boat is frequently more or less submerged in mud so as to require a much greater force to pull the hull free from the bottom than otherwise would be necessary. To overcome these difficulties, and the difficulties encountered otherwise in raising and floating boats, I have invented the following described method and apparatus.

Figure 1:
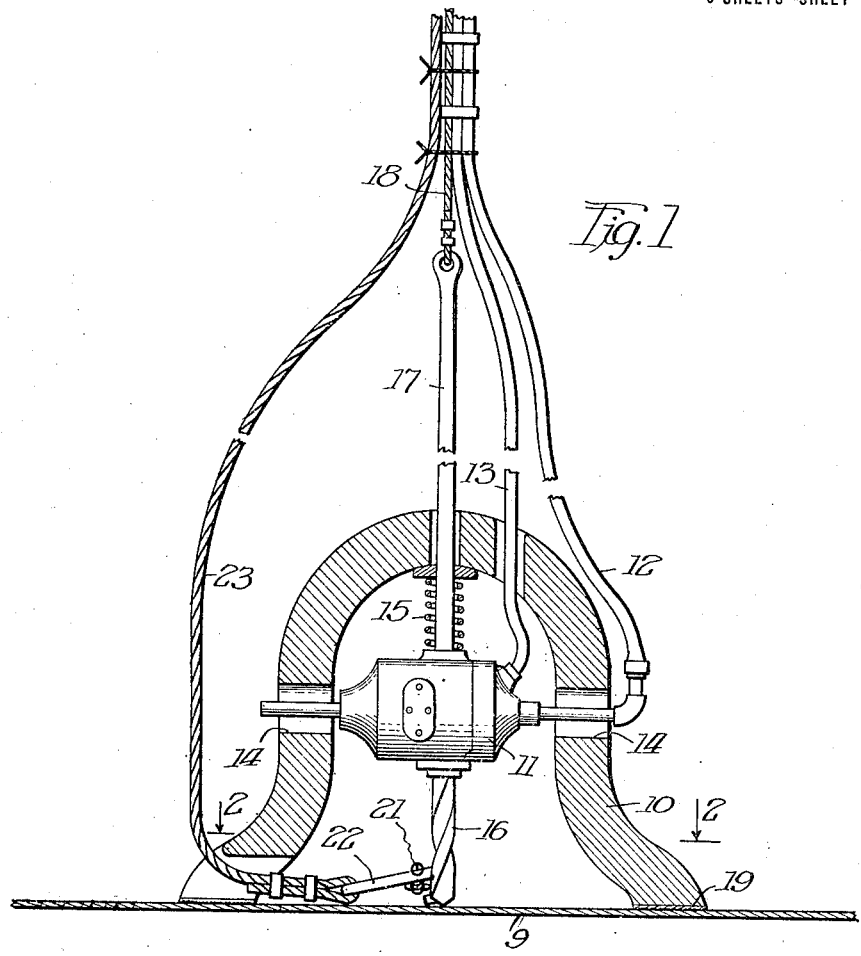
Figure 3:
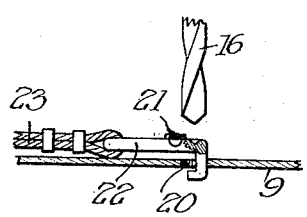
Figure 2:
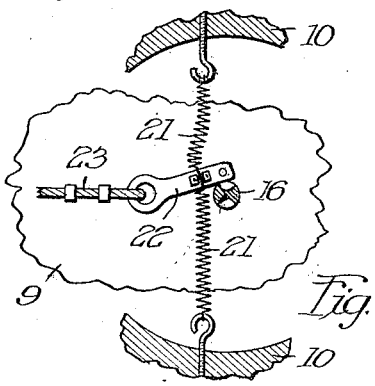

Of the accompanying drawings Figure 1 is an elevation, partly in section, of a certain apparatus which may be used in carrying out my invention. Fig. 2 is a fragmental section along the line 2—2 of Fig. 1. Fig. 3 is a view of a portion of the apparatus of Fig. 1. Fig. 4 is a horizontal sectional view of a barge which may be used. Fig. 5 is a transverse section of the barge along the lines 5—5 of Fig. 4. Fig. 6 is a section along the lines 6—6 of Fig. 5. Figs. 7 to 13 are diagrammatic views showing the method of raising and floating the sunken boat. Fig. 14 is a device for temporarily closing holes through the boat. Figs. 15 and 16 are elevations of grappling devices which may be used. Fig. 17 shows various grappling means applied to a boat. Fig. 18 is a view of a ring used in connection with the devices shown in Fig. 17. Fig. 19 is a plan view of a fleet of barges in use. Figs. 20 and 21 are diagrammatic views of a modified method of elevating and floating the boat. And Figs. 22 and 23 are detail views of parts of the apparatus used with the modified method.

Although my method may be applied to sunken boats in general without reference to the particular conditions which affect them, yet, for the purpose of illustration in this instance, I shall select a boat 9 sunk in deep water, lying upside down, and submerged more or less in mud. With a boat under any conditions it is difficult to grapple the hull with sufficient strength to pull it free from the bottom of the sea, and it is particularly difficult to do so under the above mentioned conditions. The first step which I carry out, therefore, is to investigate with reference to the condition of the boat and its surroundings. In order to find the boat, assuming its general location is known, the bottom of the sea is dragged with cables, the ends of which are supported by motor boats located some distance apart, until the cable comes against the hull.

When the boat is found the condition of the ground surrounding the boat is investigated. To accomplish this a weighted pipe is used, which has in its lower end a check valve opening upwardly. The pipe, supported by a cable is lowered rapidly, the force of the water opening the valve and allowing the water and finally the mud to pass up into the pipe until the bottom is reached when the pipe is raised, the valve preventing the contained mud from passing out. In this manner both the depth and the quality of the mud can be determined.

If the mud is only a few feet deep no further attention to it is necessary; but if it is many feet deep it is desirable to dredge around the sides of the boat, particularly if the hull is inverted, so as to allow the water to pass more or less freely under the hull as it is raised. This dredging may be done in any suitable manner, for instance by means of an ordinary rotary dredge with a pipe extending down around the vessel.

In order to assist in directing the work, or perhaps in finding the vessel, diving bells may be used. For this purpose I prefer a bell supported by suitable cables, with means for signaling to the operators in a motor boat above, with a powerful electric light above outside or inside the bell, and with a propeller and rudder which may be operated from the inside by hand or otherwise.

The next step is to attach to the hull some form of grappling means. Any suitable grappling means may be used, but the apparatus which I prefer comprises means for drilling holes through the bottom or sides of the hull, and means for fastening cables in the drilled holes.

The drilling means comprises a very heavy bell casing 10, in which is mounted a drill. Any suitable drill may be used. I prefer for the purpose an ordinary pneumatic drill 11, with compressed air tubes 12, and 13, attached thereto in any suitable manner. The drill is supported in horizontal slots 14 in the bell casing by means of tubes or rods fixed to the drill casing and extending through the slots. A strong compression spring 15, tends to force the drill casing, and thus the bit 16, downwardly, the casing being held with the bit downward by means of a rod 17 extending upwardly freely through the casing. A cable 18 fixed to the rod provides means for lowering and raising the casing. Fixed to the lower edge of the casing is a friction pad 19 made of any suitable material, such as crushed agate embedded in a sheet of asphalt. By having the bell casing 10 of sufficient mass, the tendency of the drill when in operation to rotate the bell will be overcome by the friction pad.

It becomes necessary, however, to provide means for attaching a cable to the hull by means of the hole, and this is done automatically in the following manner: Within the bell, fixed to the walls thereof, are centering springs 21, which are attached to a hook 22, in such a manner that the springs will be raised freely from the hook when the bell is raised. These springs are adjusted so that the hook will be drawn thereby over the hole made by the drill when the bit is raised, as indicated in Fig. 3. Fixed to the hook is a suitable cable 23, which passes out from the bell through a recess in the lower edge of the bell. In practice when the drill is reversed, and the bit withdrawn out of the way, the springs will pull the hook over the drilled hole, and the hook may then be forced down into the hole by the bit. The bell and drill may then be raised, at the same time pulling cable 23 free from the messenger cable 18, which is fastened thereto by means of a weak cord, leaving the cable 23 fastened to the hull by means of a hook. When the cable 23 is pulled upwardly the outer end of the hook will be pulled upwardly also and the shape and size of the hook with reference to the size of the hole is such as to prevent the hook from being pulled from the hole; so that a firm hold on the hull is obtained.

In practice, by the use of the barges hereinafter described, or in any other suitable manner, the drill bell, with the drill and hook properly supported therein, is lowered by the cable 18 onto the hull of the boat; and the drill is set in operation by the admission of compressed air, as is indicated by Fig. 7. As many cables as may be necessary may thus be attached to the hull by drilling other holes; and the cables as they are attached may be used as guides for drilling other holes and attaching other cables.

The next step is to detach the hull from the ground. In order to accomplish this it becomes necessary to provide powerful means for elevating the boat, and means which may be controlled perfectly; as, in practice, some of the attachments to the hull are likely to pull loose, and the entire weight thrown on the others will pull them loose also, and the entire work will need to be done over again, resulting in an entire set of new holes; so that the hull would be so riddled with holes as to be badly damaged. In general it becomes desirable, when sufficient attachments have been made, to elevate the hull extremely slowly, uniformly, and evenly, until it is free from the ground. The rate of movement must be very slight at first in order to allow the water to work in through the remaining mud, filling any partial vacuums which tend to form, and assisting in buoying up the hull. This also allows the inertia of the water above the boat, and of the boat itself to be overcome, and thus prevents jerking or any undue stress on the attachments. Because of this, uniformity of movement is desirable, any accelerations or retardations, no matter how slight, may be sufficient to overcome one of the attachments, and the resulting redistribution of the forces may cause disaster. The boat should also be elevated evenly, as any tilting whatever will vary the stresses, and may break loose some attachment. And it should be understood that this method of raising the boat is desirable when any type of grappling devices is used, as, at the best, it is usually impossible to grapple, with any devices, a hull sunk in deep water, whether it is inverted or not, sufficiently firmly to eliminate danger of rupture.

The elevating means which I prefer comprises a fleet of barges 30, the details of which I have illustrated in Figs. 4, 5 and 6. While it is not at all essential that the barges be similar to the one illustrated, yet I will assume them to be substantially alike. Each barge is equipped with suitable life boats 31 and motor boats 32, for obvious uses; its deck 33 is substantially water tight, and a high tower 34 is provided in case the barge is inadvertently pulled below the surface of the water. Within the barge are provided suitable air tanks 35, air compressor 36, rotary pump 37, electric generator 38, and other suitable apparatus. Along the central portion of the barge are a plurality of hoisting units 39 comprising a steam engine 40, operating, through spur gearing 41 and worm gearing 42, at a very slow rate, a winding drum 43. Adjacent each of these units is a hoisting shaft 44 extending through the bottom of the boat and upward to near the upper deck. These shafts are positioned alternately on opposite sides of the keel 45.

The purpose of the shafts 44 is to allow the operators to more conveniently manipulate the elevating cables, and to throw the downward pull on the barges near the centers thereof so as to avoid any tendency to overturn the barges. Any suitable block and tackle system may be used. I prefer a cable 46, with one end fixed to the sheave frame 47, and thence passing upwardly over the sheave 48, rotatably mounted over the upper end of the shaft; thence down around the movable sheave 49; thence upwardly over the guide sheave 50; and thence around the drum 43; the slack end of the cable, if desired, being wound around a storage drum 51. In use the cable 23, fixed to the hook 22, which is attached to the hull, passes upwardly, and is attached to the hook 52 of the frame 47. By the use of this apparatus, a very slow, uniform and powerful force may be applied to the hook 22.

Other blocks and tackles may be operated in the shaft 44, the pulling ends thereof going to the drum 43, or to an adjacent drum by means of the sheave 55 and the cables 56. When the forces through the same shaft are thus distributed to two elevating units, in case of one unit becoming disabled part of the force through the associated shaft will continue, and the stress on that part of the barge will thus continue. The force is further distributed over the floor by means of the trusses 57.

In order to facilitate attaching the cables to the winding drums, and for various other purposes, I provide the endless messenger cables 60 passing over the guide pulleys 61, through the shaft 44, under the barge and up the side, as indicated in Fig. 5. By fastening the cable 23 to the link 62, the cables may be conveniently passed through the shaft and attached to the hook 52, or to the winding drum.

Not only are there a plurality of shafts and elevating units provided for each barge, but as many barges as may be necessary may be used. The barges are usually arranged to operate in pairs, the two boats of each pair being positioned on opposite sides of the sunken boat. Fig. 19 shows a fleet of three pairs of barges raising a sunken boat. In addition to the barges suitable buoyancy means may be used if desired, such, for example, as are illustrated and described in my copending application Serial No. 228292. Also suitable signaling means may be used in order to facilitate the proper simultaneous manipulation of the various elevating means.

Having made suitable attachments to the hull and connections to the hoisting means, force is applied as equally as may be to all of the elevating cables, and the hull is very slowly and carefully raised off the bottom of the sea. Any suitable means are used to insure substantially equal tension on all of the cables 23, so as to properly distribute the forces acting on the hull. Thus the depth to which the barges are sunk by the downward pull of the cables will determine roughly the relative forces acting on the barges; and by shifting cables from one barge to another the forces may be properly distributed.

When the hull has been raised from the ground, as indicated in Fig. 8, the next step in my method is to more firmly attach the elevating cables to the hull, so that the raising may continue more rapidly and safely. It is to be understood that up to this point so much care and deliberation may be necessary as to require many hours to elevate the hull entirely free of the ground after the elevating force is applied. But by more firmly grasping the hull the remainder of the elevating may be carried on far more rapidly. To accomplish this I prefer to drag a slack cable along the bottom of the sea, with each end supported by a motor boat, until the cable passes under the hull. The position of the hull when raised from the ground is clearly indicated by the positions of the supporting barges; and the position of the slack cable with reference to the hull can be determined by occasionally elevating the ends of the cable. When the cable is in place its ends are connected to suitable messenger cables 60, and are thus drawn into the shaft and attached to the winding drums of the hoist.

In this manner a suitable number of cables 70 are passed under the hull to support the boat, as indicated in Fig. 9. The hull is then raised by means of cables 23 and 70, as rapidly as may be expedient, until it is within easy working distance of the surface of the water. All of the cables are used in order to more uniformly distribute the forces acting on the hull.

The cables 23 are then allowed to hang loosely, and the hooks may be removed by divers; and at the same time the holes are closed, or capped, by any suitable means such as the device shown in Fig. 14, hereinafter described.

The next step is to invert the hull. This is carried out by raising one side of the hull and lowering the other, as indicated in Fig. 10, thus rolling the hull over in its supports until it is right side up. This is possible because of the fact that the hull is so supported as to give control of one side more or less independent of the other, so that one side may be elevated while the other side is being lowered.

It then becomes desirable to increase the self-contained buoyancy of the boat until it is able to float by its own buoyancy, in order to bring it out from under the barges and to bring it clear up to the surface. To accomplish this I attach to its sides deflated bags 71, composed of any suitable material, such as duck, and incased in suitable steel netting 72. The bags may be connected in pairs by means of cables 73 passing under the boat as indicated in Fig. 11. When suitably attached the bags are inflated with compressed air, by any suitable means, such as the system described in my copending patent application No. 228292, and as indicated in Fig. 12. When a sufficient number of bags have been attached and inflated the buoyancy will be sufficient to raise the boat to the surface, where any opening through the hull may be temporarily repaired and the water pumped out, and the boat may be floated to a repair dock under its own buoyancy. During the floating and repairing operations, however, the cables 70 are left in place as a safety measure in case of any accident.

In repairing the boat dead lights and other small openings may be closed temporarily by mattresses, or by any suitable means such as that shown in Fig. 14. This device comprises a bolt 75 passing through a plate 76 having fixed thereto a padded gasket 77, and also passing through a toggle bar 78. The bolt head and toggle bar 78 are passed through the opening and the plate is pressed against the edges of the opening by means of the nut 79. When the boat is sufficiently repaired the water may be pumped out, and the buoyancy bags 71 removed.

In raising sunken boats the grappling means most desirable depend much upon the special conditions. The use of the drill hereinabove described is peculiarly applicable to inverted boats, or boats lying on one side. We may next consider the boat lying right side up. In such a case other forms of grappling devices may be more effective. Referring to Fig. 17, assuming that the sunken boat 9 is not too deeply embedded in the mud, I first pass under the bow 81 and the stern 82 the respective loops of cables 83 and 84. To accomplish this the cables may be dragged on the ground, by motor boats, until the cables pass under the ends of the hull. Or divers or salvaging submarines may be used to assist in putting the cables in place. Having placed the cables the four ends are brought together to one of the barges and are passed up through the shaft, and each pair of cables is attached to the hoisting means. A hinged ring 85 is then opened, by removing the bolt 86, and it is then closed around the four cables, and is locked closed by replacing the bolt. The ring is then allowed to slip downwardly on the cables. Fixed to this ring is a cord 87 which serves as a means for indicating the depth to which the ring descends, and which may be used to raise or to assist in lowering the ring. The purpose of the ring is to hold the cables together so as to prevent them from slipping off of the boat, and for this reason the depth to which the ring descends on the cables is important. Teeth 88 are provided on the rings to prevent them from slipping upwardly when tension is applied to the cables to raise the boat.

A second pair of cables 89 and 90 is then applied to the boat in a similar manner and connected to another barge, or to another portion of the same barge, to assist in the raising, and to control the tilting of the boat, and thus to prevent any of the cables from slipping. As many more cables as may be desired may be applied. It will frequently be found, however, that additional means are required to assist in raising the boat, as the cables may not provide sufficient control or sufficient lifting power. And in some cases the cables cannot be attached at all.

One additional device which I provide is a harpoon 92 which is adapted to be driven through some portion of the boat. This device is shown in Fig. 15 herein, and is fully described in my copending application for a patent, Serial No. 232,677. The device comprises a heavy shank 93 to the lower end of which are pivoted the members 94 which, when closed, as indicated in full lines in Fig. 15, form a pointed lower end, but having protruding upper ends 95 which prevent the withdrawal of the harpoon after it has pierced through some portion of the vessel. In order to provide better gripping means the members 94 are pivoted so that the ends 95 are forced outwardly when an attempt is made to withdraw the harpoon, the members taking the position indicated by dotted lines in Fig. 15. Springs 96 force the members into the closed position when free to do so. The shank has fixed to its upper end a pulley 97 by means of which a cable 98 supports the harpoon or pulls upwardly thereon when the harpoon becomes attached to the boat, the ends of the cable passing upwardly to one of the barges and being connected to the hoisting means.

In operation the cable is slacked out from the barge and the harpoon is allowed to drop, point downward, upon some suitable portion of the boat. If necessary the harpoon is dropped repeatedly, in the same place, until an opening is forced through the deck, or some other suitable portion of the boat. Fins 99 assist in maintaining the harpoon in an upright position, and tend to prevent it from shifting from over the desired position. Other similar devices may be attached to other portions of the boat; and thus desirable lifting means are provided, and very complete control of the tilting of the boat is obtained.

As a further assistance in controlling and lifting the boat I provide the grappling tongs 100 described in my copending application Serial No. 232,677, and shown in Fig. 16 herein. The tongs comprise the pivoted jaws 101, each having a handle 102. Attached to each handle is a pulley 103. By means of these pulleys a cable 104 supports the tongs. The ends of this cable pass upwardly to a barge, and are fixed to the hoisting means. When tension is applied to the cable the handles will tend to close the jaws. In order to fully control the opening and closing of the jaws, I provide links 105, pivoted to the respective handles and to each other, and a cable 106, which is clamped to one of the links by means of a clamp 107. By pulling upwardly on this cable the jaws will tend to close. The cable passes downwardly from the clamp, around a pulley 108 pivotally connected to the tongs by means of a link 109, and the cable then passes upwardly to the barge. Thus by pulling upwardly on this strand of the cable the tongs will be opened and the inner end of the links will be pulled down below a line connecting the outer ends, and the tongs will be locked open. By means of the cable 106 the tongs may be opened and closed at pleasure, and projecting beams or other suitable portions of the boat may be grasped thereby. As many tongs as are desired may be used, and in this way much greater lifting power and better control of the boat may be obtained.

When the boat has been lifted from the ground it may happen that some of the lifting means begin to yield, or for some reason are deficient; or other lifting means may be necessary. In such an event cables 110 may be passed under the boat, with rings 85 holding the cables snugly against the sides of the boat. The boat will then be firmly held and can be raised to a height where it can be floated by the use of any suitable means.

To further assist in raising the boat, hooks 111 may be hooked into dead light openings 112, and may be pulled upwardly by means of cables 113 passing around pulleys 114.

Fig. 20 is a diagrammatic view of a modified method of grappling and elevating the boat 9. When the hull can be reached by operators, hooks 115 may be hooked into the dead lights and by means of cables 116 attached thereto the hull can be raised from the ground. Cables 117 may then be passed under the hull, and the hull may then be raised and inverted, in the manner hereinabove described.

After inverting the hull, instead of floating it by the pneumatic bags, as hereinabove described, the following method may be pursued:

Referring to Fig. 21, the barges 30 which are supporting the boat 9 by means of the cables 117; are separated sufficiently to allow the boat to pass between them, and are held so separated by means of straining beams 118, the ends of which are supported by any suitable means, such as the planks 119; the planks in turn being supported by cables 120, by means of which the planks may be raised or lowered at pleasure by any suitable means in the barges. When the barges are thus arranged the boat may be raised by the hoisting means until the upper edges of the boat pass between the barges. Suitable rollers may then be supported between the sides of the barges and the boat by means of cables 124. I prefer for this purpose the rollers 121 which comprise a core of iron pipe 122 surrounded by a cylindrical mattress 123, which is composed of woven rope or other suitable material. The beams are then elevated and removed, allowing the barges to move toward each other and press against the rollers. The boat is then elevated farther by the hoisting means, until the upper portion is above the water, when any holes through the sides may be temporarily repaired, and the water pumped out, or the fleet of barges supporting the boat may be floated wherever desired.

I claim as my invention:

1. A method of salvaging inverted sunken boats consisting in making holes through the boat, in attaching elevating means to the boat through said holes, in slowly, uniformly and evenly elevating the boat free from the ground, then firmly grappling the boat, then elevating the boat until near the surface of the water, then turning the boat over, and in then increasing the self contained buoyancy of the boat until it floats under the buoyancy.

2. A method of salvaging inverted sunken boats consisting in drilling holes through the hull of the boat, in attaching elevating means to said hull by means of said holes, in slowly and uniformly elevating said boat free from the ground, in more firmly grappling said hull, in raising said boat comparatively rapidly until adjacent the water surface, in then raising one side of the boat and lowering the other until said boat is right side up, and in then increasing the self-contained buoyancy of the boat until it rides by virtue of said buoyancy.

3. A method of raising a sunken and inverted boat, consisting in grappling the hull of the boat, in raising the boat a considerable distance, in rolling the boat until it is right side up, and in then increasing the buoyancy of the boat until the buoyancy becomes greater than the weight of the boat.

4. A method of elevating sunken boats consisting in grappling the hull of the boat, in raising the boat until free from the ground; in grappling the hull more firmly, in raising the boat farther; in rolling the boat over until it is right side up, and then in increasing the buoyancy of the boat until it becomes greater than the weight of the boat.

5. A method of salvaging sunken boats consisting in making holes through the boat, in attaching elevating means to the boat by means of said holes, in slowly and uniformly elevating said boat off the ground, in more firmly grappling said hull, then raising said boat comparatively rapidly, and in then turning the boat over while it is suspended until it is right side up.

In testimony whereof, I hereunto set my hand.

HENRY D. DEAM.

Copies of this patent may be obtained for five cents each, by addressing the "Commissioner of Patents, Washington, D. C."